(No Model.)

J. R. PARSONS & D. A. WILLCOX.
VEHICLE.

No. 435,154. Patented Aug. 26, 1890.

WITNESSES:
C. L. Bendixon
Mark W. Dewey

INVENTORS:
John R. Parsons
and DeForest A. Willcox
BY
Duell, Laass & Duell
ATTORNEYS

UNITED STATES PATENT OFFICE.

JOHN R. PARSONS AND DEFOREST A. WILLCOX, OF EARLVILLE, NEW YORK.

VEHICLE.

SPECIFICATION forming part of Letters Patent No. 435,154, dated August 26, 1890.

Application filed March 31, 1890. Serial No. 345,989. (No model.)

*To all whom it may concern:*

Be it known that we, JOHN R. PARSONS and DEFOREST A. WILLCOX, of Earlville, in the county of Madison, in the State of New York, have invented new and useful Improvements in Vehicles, of which the following, taken in connection with the accompanying drawings, is a full, clear, and exact description.

This invention relates to the connection of the vehicle-body to the front running-gear, and has more particularly reference to the class of vehicles in which the body is formed with a dropped or depressed portion extending lengthwise of the body between the running-gears, and the end portions are extended straight over the running-gears. Experience with said class of vehicles has disclosed the fact that they do not afford sufficient room under the vehicle to allow the front axle to be cramped, so as to make short turns with the vehicle, and on that account the front end of the depressed central portion has heretofore been formed tapering from the sides of the center and the running-gear was pivoted to the bottom of said end of the depressed body portion, as shown in our prior patent of October 23, 1888, No. 391,640.

The chief object of our present invention is to overcome the aforesaid difficulty without resorting to the aforesaid tapering of the depressed body portion and the pivoting of the running-gear to the bottom of said depressed body portion; and to that end the invention consists in the improved construction and combination of parts, as hereinafter fully described, and specifically set forth in the claims.

Figure 1:
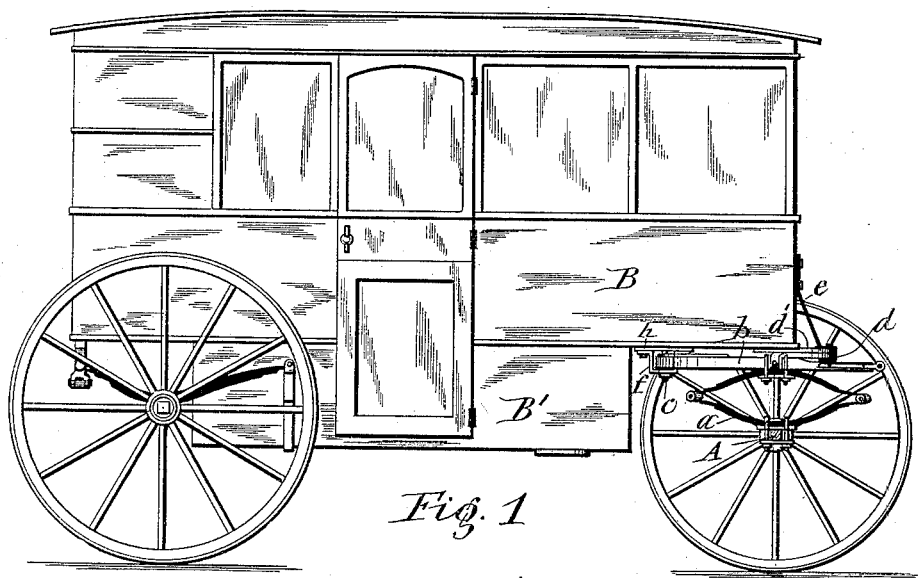
Figure 4:
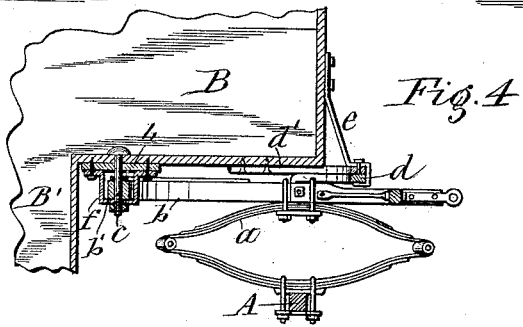
Figures 2, 3:
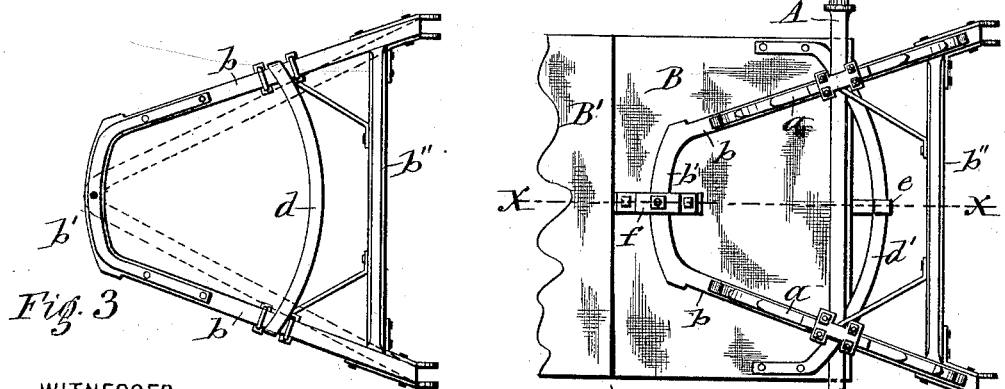

In the annexed drawings, Figure 1 is a side elevation of a vehicle embodying our improvements, one of the front wheels being broken away to better illustrate the invention. Fig. 2 is an enlarged inverted plan view of the front end portion of the vehicle. Fig. 3 is a detached top plan view of the frame by which the front running-gear is connected to the body of the vehicle; and Fig. 4 is a longitudinal section on line $x$ $x$, Fig. 2.

Similar letters of reference indicate corresponding parts.

B represents the body of the vehicle, which is formed with the dropped or depressed portion B', extending lengthwise of the body between the running-gears and terminating with square ends inside of the two axles.

A denotes the front axle, on which we mount and rigidly secure in the usual manner the springs $a$ $a$, preferably of elliptic form, as shown. These springs are disposed diagonally on the axle and in lines converging rearward. Upon the top of the said springs we place and rigidly fasten the horizontal frame $b$, which is formed with side bars disposed parallel with the springs $a$ $a$, upon which the said side bars are fastened by clips or bolts in the usual and well-known manner, said side bars being united at their ends by two cross-bars $b'$ $b''$ or by the single cross-bar $b''$ at the front and by a direct union of the rear ends of the side bars, as represented by dotted lines in Fig. 3 of the drawings.

Over the rear cross-bar $b'$ of the frame $b$ is a metal plate or strap $h$, fastened to the under side of the body central of the width thereof, and to this strap is attached by bolts and nuts a yoke $f$, which embraces the cross-bar $b'$, and through the strap $h$, yoke $f$, and intervening portion of the cross-bar $b'$ passes the king-bolt $c$, as shown in Fig. 4 of the drawings.

To the top of the front portion of the frame $b$ is secured the bottom segment $d$ of the fifth-wheel, and the corresponding top segment $d'$ of the fifth-wheel is fastened to the under side of the body B and projects at the front thereof, where it is supported by a brace $e$, which is secured at its upper end to the front of the body and has its lower end fastened to the top segment $d'$ and extended around the under side of the bottom segment $d$, so as to embrace the same, as shown in Fig. 4 of the drawings. The diagonal position of the springs $a$ $a$ and side bars of the frame $b$ and the pivoting of the rear end of said frame to the body B allow the axle A to be cramped, so as to turn short curves with the vehicle, and while so turning the axle the fifth-wheel is effectually supported by the brace $e$.

Having described our invention, what we claim as new, and desire to secure by Letters Patent, is—

1. The combination, with the front running-gear, of the body formed with the depressed central portion B', springs mounted diagonally on the axle and converging rearward therefrom, a frame formed with side bars parallel with said springs and mounted thereon, and said frame pivoted at its rear end to the body, as set forth and shown.

2. The combination of the body formed with the dropped portion B′, extending lengthwise of the body between the running-gears, elliptic springs $a\ a$, mounted diagonally on the front axle and in rearwardly-converging lines, the frame $b$, formed with side bars parallel with the aforesaid springs and mounted thereon, the king-bolt $c$, passing through the rear end of said frame, the fifth-wheel segment $d$, secured to the top of the front portion of the frame $b$, the segment $d'$, secured to the under side of the body and projecting at the front thereof, and the brace $e$, attached to the front of the body and to the segment $d'$ and embracing the underlying segment $d$, substantially as described and shown.

In testimony whereof we have hereunto signed our names this 26th day of March, 1890.

JOHN R. PARSONS. [L. S.]
DEFOREST A. WILLCOX. [L. S.]

Witnesses:
WALTER D. WILLCOX,
A. G. DAVIS.